United States Patent
Bastel et al.

(10) Patent No.: US 9,611,901 B2
(45) Date of Patent: Apr. 4, 2017

(54) FREEWHEEL ARRANGEMENT

(71) Applicant: BorgWarner Inc., Auburn Hills, MI (US)

(72) Inventors: Norbert Bastel, Oberhausen-Rheinhausen (DE); Till Martin Lutz Ebner, Seeheim-Jugenheim (DE); Rolf Koestel, Bruchsal (DE); James Ronald Papania, Bolingbrook, IL (US); Volker Heinz, Roemerberg (DE); Dirk Achim Schmitt, Leimen (DE)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 14/402,699

(22) PCT Filed: May 23, 2013

(86) PCT No.: PCT/US2013/042333
§ 371 (c)(1),
(2) Date: Nov. 21, 2014

(87) PCT Pub. No.: WO2013/181049
PCT Pub. Date: Dec. 5, 2013

(65) Prior Publication Data
US 2015/0136557 A1    May 21, 2015

(30) Foreign Application Priority Data

Jun. 1, 2012  (DE) .................. 10 2012 010 830

(51) Int. Cl.
*F16D 41/06*   (2006.01)
*F16D 41/066*  (2006.01)
(Continued)

(52) U.S. Cl.
CPC ......... *F16D 41/066* (2013.01); *F02N 15/023* (2013.01); *F16D 41/06* (2013.01); *F02N 11/0851* (2013.01); *F16D 2041/0665* (2013.01)

(58) Field of Classification Search
CPC . F16D 41/06; F16D 41/066; F16D 2041/0665
See application file for complete search history.

(56) References Cited

U.S. PATENT DOCUMENTS

| 646,997 A * | 4/1900 | Jones ............... F16C 33/34 |
| | | 29/898.068 |
| 2,902,125 A * | 9/1959 | House ............... F02N 15/023 |
| | | 192/45.019 |

(Continued)

OTHER PUBLICATIONS

International Search Report and Written Opinion; Date of Mailing, Aug. 23, 2013; for International Application No. PCT/US2013/042333; 12 pages.

*Primary Examiner* — Richard Lorence
*Assistant Examiner* — David Morris
(74) *Attorney, Agent, or Firm* — BrooksGroup (57) ABSTRACT

A freewheel arrangement having a freewheel, which comprises an inner ring, an outer ring rotatable in a first direction of rotation relative to the inner ring, and clamping elements between the inner ring and the outer ring, which prevent a rotation of the outer ring relative to the inner ring in a second direction of rotation. The outer ring and the inner ring and the clamping elements may be formed as a stamped sheet metal part.

20 Claims, 3 Drawing Sheets

(51) Int. Cl.
*F02N 15/02* (2006.01)
*F02N 11/08* (2006.01)

(56) References Cited

U.S. PATENT DOCUMENTS

| | | | | |
|---|---|---|---|---|
| 2,939,323 | A | * | 6/1960 | Kochendorfer ......... F02C 7/275 |
| | | | | 192/45.02 |
| 4,570,762 | A | | 2/1986 | Husmann |
| 5,219,053 | A | * | 6/1993 | Castens ................ F16D 41/061 |
| | | | | 192/45.017 |
| 5,573,094 | A | * | 11/1996 | Roberts ................ F16D 41/061 |
| | | | | 192/41 R |
| 5,779,015 | A | * | 7/1998 | Murata ................ F16D 41/066 |
| | | | | 192/42 |
| 6,131,362 | A | * | 10/2000 | Buecker .................... E04B 5/10 |
| | | | | 29/897.35 |
| 6,527,094 | B2 | | 3/2003 | Reinhart et al. |
| 8,172,056 | B2 | | 5/2012 | Barraud et al. |
| 2002/0045508 | A1 | * | 4/2002 | Man ...................... B60K 6/365 |
| | | | | 475/5 |
| 2008/0112662 | A1 | * | 5/2008 | Nash ...................... F16C 19/46 |
| | | | | 384/567 |
| 2009/0145263 | A1 | * | 6/2009 | Ono .......................... C23C 8/26 |
| | | | | 74/7 C |
| 2009/0260930 | A1 | | 10/2009 | Lotz |
| 2012/0000741 | A1 | | 1/2012 | Altman et al. |

\* cited by examiner

FREEWHEEL ARRANGEMENT

This application claims the benefit of PCT Application Serial No. 2013/042333 filed May 23, 2013, and German Patent Application Serial No. DE 102012010830.3 filed Jun. 1, 2012.

The present invention relates to a freewheel arrangement having a freewheel, which comprises an inner ring, an outer ring rotatable in a first direction of rotation relative to the inner ring, and clamping elements between the inner ring and the outer ring, which prevent a rotation of the outer ring relative to the inner ring in a second direction of rotation.

Freewheel arrangements that are used to couple a starter to an engine output shaft are known from the prior art. The known freewheel arrangements comprise a freewheel, which comprises an inner ring, an outer ring rotatable in a first direction of rotation relative to the inner ring, and clamping elements between the inner ring and the outer ring, which prevent a rotation of the outer ring relative to the inner ring in a second direction. Clamping rollers, clamping bodies, which in contrast to clamping rollers have a peripheral shape deviating from a circle, and pawls are used as clamping elements, wherein the latter are generally biased by means of a spring element in their locking position, in which the pawl engages in a detent recess on the other ring of the freewheel.

The known freewheel arrangements have, however, proven to be disadvantageous in so far as they require relatively complex manufacture and take up a relatively large amount of axial installation space.

The object of the present invention is therefore to create a freewheel arrangement having a freewheel, with which the manufacture of the freewheel arrangement and/or of the freewheel is simplified and which has merely a short axial overall length.

This object is achieved by the features specified in claim 1. Advantageous embodiments of the invention are disclosed in the dependent claims.

The freewheel arrangement according to the invention comprises a freewheel. The freewheel comprises an inner ring, an outer ring rotatable in a first direction of rotation relative to the inner ring, and clamping elements between the inner ring and the outer ring, wherein the clamping elements prevent a rotation of the outer ring relative to the inner ring in a second direction of rotation opposite the first direction of rotation. For example, the clamping elements may be clamping rollers, clamping bodies or pawls. In accordance with the invention, the outer ring and the inner ring and/or the clamping elements are each formed as a stamped sheet metal part.

Since the outer ring and the inner ring and/or the clamping elements are each formed as a stamped sheet metal part, the manufacture of the freewheel of the freewheel arrangement according to the invention is simplified, in particular since the outer ring and the inner ring and/or the clamping elements can be manufactured easily by being stamped out from a sheet metal part. In addition, the sheet metal part from which the outer ring and the inner ring and/or the clamping elements are stamped out may be relatively thin-walled, such that the outer ring and the inner ring and/or the clamping elements have a particularly low thickness, which ultimately leads to a short axial overall length of the freewheel and thus of the freewheel arrangement.

In order to transfer a torque from or to the inner ring and outer ring of the freewheel, the freewheel further comprises a first and second torque transfer element in an advantageous embodiment of the freewheel arrangement according to the invention. The first torque transfer element is fastened on the outer ring in a rotationally engaged manner, whereas the second torque transfer element is fastened on the inner ring in a rotationally engaged manner.

In a particularly advantageous embodiment of the freewheel arrangement according to the invention, the first and/or second torque transfer element is formed by a sheet metal part, possibly a sheet metal part shaped in the manner of an annular disk. The manufacture of the freewheel and of the freewheel arrangement is thus further simplified, wherein in this case it is also preferable if the first and/or second torque transfer element is formed by a stamped sheet metal part in order to further simplify the manufacture of the freewheel. In this embodiment, a particularly thin-walled sheet metal part or stamped sheet metal part may also be used in order to keep the axial overall length of the freewheel low.

In a particularly advantageous embodiment of the freewheel arrangement according to the invention, the first and/or second torque transfer element is riveted to the outer and/or inner ring, whereby the production of the freewheel can be further simplified. In other words, the first torque transfer element is riveted to the outer ring, wherein the second torque transfer element is alternatively or additionally riveted to the inner ring.

In a preferred embodiment of the freewheel arrangement according to the invention, the outer ring, preferably via the aforementioned first torque transfer element, is connected with rotary entrainment to an output side of a drive unit, said output side being arranged radially inwardly based on the freewheel, whereas the inner ring, preferably via the aforementioned second torque transfer element, is connected with rotary entrainment to an output side of a starter, said output side being arranged radially outwardly based on the freewheel. In this embodiment, it is also preferable if the drive unit is formed by an engine, possibly by an internal combustion engine, such that the output side of the drive unit is formed by an engine output hub. In addition, it is preferable in this embodiment if the second torque transfer element comprises a rotation-entraining contour or a toothing, with which the output side of the starter is connected or engaged with rotary entrainment. The rotation-entraining contour or toothing may be provided here for example directly on the second torque transfer element, however the rotation-entraining contour or toothing may also be formed on a rotation-entraining element that is connected with rotary entrainment to the second torque transfer element or is connected in a rotationally engaged manner thereto. The output side of the starter is particularly preferably permanently connected or engaged with rotary entrainment to the inner ring, possibly to the rotation-entraining contour or the toothing. The need for the output side of the starter to first be connected with rotary entrainment with the inner ring of the freewheel before the starter can drive the output side of the drive unit is thus eliminated, such that the freewheel arrangement in this variant is suitable to a certain extent for a freewheel arrangement in which the drive unit is operated with a stop-start strategy in order to reduce fuel consumption.

In a further preferred embodiment of the freewheel arrangement according to the invention, the freewheel comprises a freewheel hub, which on the one hand is connected with rotary entrainment to the output side of the drive unit, that is to say for example to the engine output hub, and on the other hand is connected in a rotationally engaged manner to the first torque transfer element. In this embodiment, it has also proven to be advantageous if the aforementioned freewheel hub is welded or riveted to the first torque transfer element or is formed in one piece therewith in order to simplify the manufacture of the freewheel. In a one-piece embodiment of the freewheel hub with the first torque transfer element, the freewheel hub is consequently formed by a portion of the stamped sheet metal part forming the first torque transfer element. In the case of a freewheel hub welded or riveted to the first torque transfer element, the freewheel hub does not necessarily have to be a sheet metal part. Rather, it may be advantageous if the freewheel hub in these cases is not formed by a sheet metal part. Depending on the application, it is thus preferable if the freewheel hub is formed by a rotary part, in particular since the shape of the freewheel hub necessary for connection on the output side of the drive unit can then possibly be produced more simply and formed in a more stable manner. This is then particularly advantageous if the rolling bearing described further below in greater detail is to be formed in part by the freewheel hub.

In a particularly preferred embodiment of the freewheel arrangement according to the invention, the inner ring is supported indirectly or directly on the output side of the drive unit via a radial bearing. Thanks to the connection and support of the outer ring on the output side of the drive unit and also the support of the inner ring on the output side of the drive unit via the radial bearing, it is ensured that the inner ring and the outer ring are always arranged at a constant distance from one another in the radial direction in spite of any deflections of the output side of the drive unit in the radial direction. The load of the inner and outer ring and also the load of the intermediate clamping elements is thus reduced considerably, such that the wear at the aforementioned components of the freewheel is reduced. In this variant, both the outer ring and inner ring and also the clamping elements can thus be formed as particularly thin stamped sheet metal parts, without becoming damaged or worn as a result of radial deflections of the output side of the drive unit. As already indicated beforehand, the inner ring can be supported indirectly or directly on the output side of the drive unit via the radial bearing. In this case, it is preferable however if the support is provided indirectly, wherein it has proven to be advantageous if the support is provided via the radial bearing and via the first torque transfer element or the freewheel hub. This has the advantage inter alia that the radial bearing, possibly the rolling bearing, can be provided together with the freewheel as a connected unit or module in order to install this in a drivetrain. In other words, the assembly of the freewheel and of the freewheel arrangement is thus simplified further.

In order to further reduce stresses of the freewheel caused by radial deflections of the output side of the drive unit, the radial bearing for supporting the inner ring is arranged so as to be radially nested with the clamping elements. If the radial bearing is formed by a rolling bearing, it is thus preferable if the rolling elements of the rolling bearing, which are arranged between a bearing inner race and a bearing outer race of the rolling bearing, are arranged so as to be radially nested with the clamping elements.

In a further advantageous embodiment of the freewheel arrangement according to the invention, the radial bearing for supporting the inner ring on the output side of the drive unit is formed as a rolling bearing with a bearing inner race and a bearing outer race, wherein rolling elements, preferably balls, arranged between the bearing inner race and the bearing outer race are provided. In order to achieve a particularly compact structure in this embodiment, the bearing inner race of the rolling bearing is preferably formed by a portion of the first torque transfer element or of the freewheel hub. In this case, reference may also be made to the fact that the bearing inner race is formed in one piece with the first torque transfer element or the freewheel hub. Besides a more compact structure, a simplified manufacture is thus also achieved, in particular since the bearing inner race formed and manufactured in one piece with the first torque transfer element or the freewheel hub does not have to be fastened in a further process step on the first torque transfer element or on the freewheel hub.

In a further preferred embodiment of the freewheel arrangement according to the invention, the second torque transfer element is fastened indirectly on the inner ring via the bearing outer race of the rolling bearing in order to support the inner ring on the output side of the drive unit. In other words, in this embodiment, the direct fastening of the second torque transfer element on the inner ring of the freewheel can be omitted, in particular since the connection to the inner ring can be achieved via the bearing outer race that is provided in any case. In this embodiment, it is also preferred if the inner ring of the freewheel and/or the second torque transfer element is/are welded to the bearing outer race of the rolling bearing so as to support the inner ring in order to provide a secure rotationally engaged connection between the aforesaid components, which additionally can be produced in a simple manner.

In an alternative preferred embodiment of the freewheel arrangement according to the invention, the inner ring of the freewheel is not supported via a radial bearing on the output side of the drive unit, but rather is supported in the radial direction on a fixed housing, possibly an engine or transmission housing. In this case, it has proven to be advantageous if the inner ring is supported outwardly in the radial direction on the fixed housing, in particular since in this case an edge, pointing inwardly in the radial direction, of an opening in the respective housing can easily be utilized and such an opening is in any case already provided in order to pass through a shaft or the like. In this embodiment, it is also preferable if the inner ring is supported via a support element formed as a sheet metal part. A freewheel arrangement of simple construction is thus created, which can also be manufactured in a particularly simple manner without thus compromising a reliable support of the inner ring in the radial direction on the fixed housing. The support element formed as a sheet metal part is preferably formed in one piece with the second torque transfer element, such that the support element can also be produced already within the scope of the production of the second torque transfer element, or riveted to the inner ring together with the second torque transfer element. In the latter case, the riveting of the second torque transfer element to the inner ring equally causes the riveting of the support element to the inner ring, such that it is possible to dispense with a further method step for fastening the support element on the inner ring, which leads to a further simplification of the manufacturing process. Irrespectively of the manner in which the support element is connected to the second torque transfer element or is formed, it is also preferable in this embodiment if the support element comprises a flange portion and a tube portion, such that the support element formed as a sheet metal part comprises a flange portion for indirect or direct fastening on the inner ring of the freewheel and comprises a tube portion for supporting the inner ring on the fixed housing in the radial direction. If the support element is to be riveted together with the second torque transfer element to the inner ring, it is thus also preferable if the second torque transfer element is riveted to the inner ring with interpositioning of the aforementioned flange portion of the support element.

In a further particularly preferred embodiment of the freewheel arrangement according to the invention, the clamping elements are connected to the outer ring with entrainment based on the peripheral direction or direction of rotation of the freewheel. This connection with entrainment can be produced for example by means of a movable fixing of the clamping elements on the outer ring. Here, the movable fixing can be produced for example by spring elements between the outer ring and the clamping element and/or by a shape deviating from a circle of the bearing surface of the outer ring facing towards the clamping element. Irrespectively of the design of the connection between the freewheel and the outer ring with entrainment in the peripheral direction or direction of rotation, this embodiment is then particularly advantageous when the outer ring is connected with rotary entrainment to the output side of the drive unit. In this case, the clamping elements entrained by the outer ring in the direction of rotation or peripheral direction of the freewheel are forced outwardly in the radial direction against the outer ring due to the high rotational speed of the outer ring and the accompanying centrifugal force, whereby the inner ring is relieved at a correspondingly high rotational speed of the output side of the drive unit. Depending on the embodiment of the clamp gap between the inner ring and the outer ring, this may preferably cause the clamping elements to lift from the inner ring. In any case, both the clamping elements and the inner ring are thus relieved, such that the stress and consequently the wear on the aforementioned parts is reduced.

In a further advantageous embodiment of the freewheel arrangement according to the invention, the freewheel is formed as a dry-running freewheel. In this embodiment, there is thus no lubricant provided between the inner ring and the outer ring on the one hand and between the inner ring and the clamping elements on the other hand. In this embodiment, it is also preferable if the freewheel within the freewheel arrangement is arranged in a dry chamber without lubricant. In this embodiment of the freewheel arrangement according to the invention, the need to feed a lubricant or to maintain a lubricant for the freewheel is consequently eliminated, whereby the freewheel arrangement as a whole can be formed more simply. In addition, a dry-running freewheel may also be arranged outside the wet chambers, normally provided, for adjacent coupling arrangements or the like, such that a freewheel that can be used in a versatile manner is created.

In a further preferred embodiment of the freewheel arrangement according to the invention, the clamping elements are formed as clamping rollers. In this context, clamping rollers are to be understood to mean clamping elements having a circular periphery. In this case, it is preferable if the bearing surfaces of the inner ring facing towards the clamping rollers are circular, whereas the bearing surfaces of the outer ring facing towards the clamping rollers have a shape deviating from a circle. As already discussed beforehand, the connection with entrainment between the clamping elements formed as clamping rollers and the outer ring can be produced by the shape deviating from a circle of the bearing surfaces of the outer ring facing towards the clamping rollers. In this embodiment, it is also preferable if the clamping rollers are biased by means of one or more spring elements in the direction of a tapering clamp gap between the inner and outer ring. In this variant, not only can the bias of the clamping rollers thus be produced in the clamping position of said clamping rollers, but rather the previously mentioned connection with entrainment between the outer ring and the clamping elements formed as clamping rollers based on the direction of rotation or peripheral direction of the freewheel can also be produced. In the latter case, the spring element is preferably supported or fastened on the clamping roller and also on the outer ring of the freewheel.

In accordance with a further particularly advantageous embodiment of the freewheel arrangement according to the invention, the clamping elements, possibly the clamping rollers, have a thickness and an outer diameter, wherein the ratio between the thickness and the outer diameter is 1:3 or less, preferably 1:4 or less, particularly preferably 1:5 or less. Clamping elements are thus created that, in spite of a relatively low thickness, can withstand the stresses during the operation of the freewheel arrangement, whereas the relatively low thickness of the clamping elements results in a short axial overall length of the freewheel. In this regard, it has proven to be advantageous if the thickness of the clamping elements or clamping rollers, and possibly also the thickness of the first and/or second torque transfer element, is at most 7 mm in order to achieve a short axial overall length of the freewheel.

In a further particularly advantageous embodiment of the freewheel arrangement according to the invention, the outer ring, the inner ring, the clamping elements, the first torque transfer element, the second torque transfer element and the radial bearing or the support element form a module that can be installed as a connected unit. The assembly of the freewheel arrangement is thus highly simplified.

The invention will be explained in greater detail hereinafter on the basis of exemplary embodiments with reference to the accompanying drawings, in which.

Figure 1:
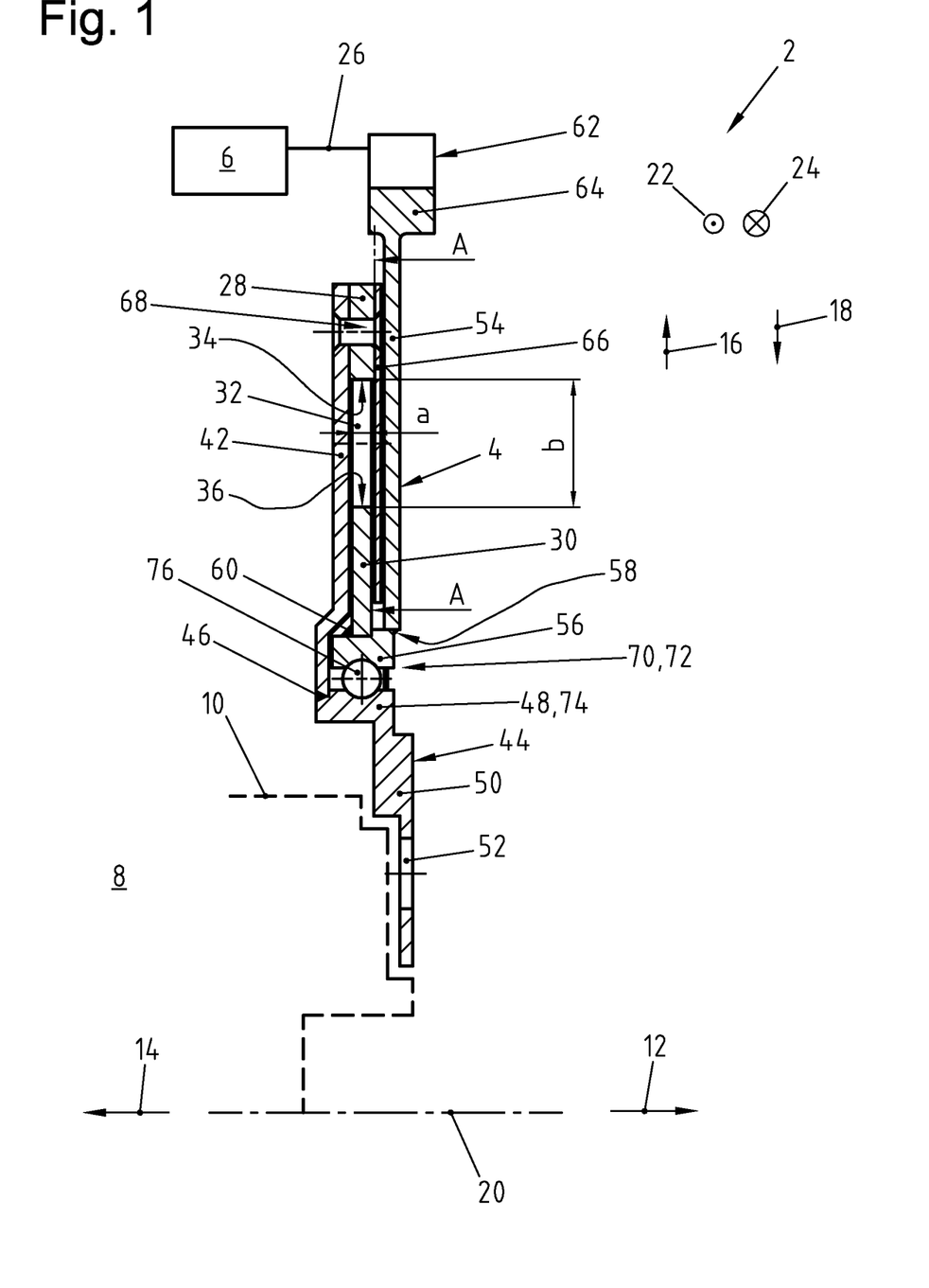
FIG. 1 shows a partial side view in section of a first embodiment of the freewheel arrangement according to the invention.
Figure 2:
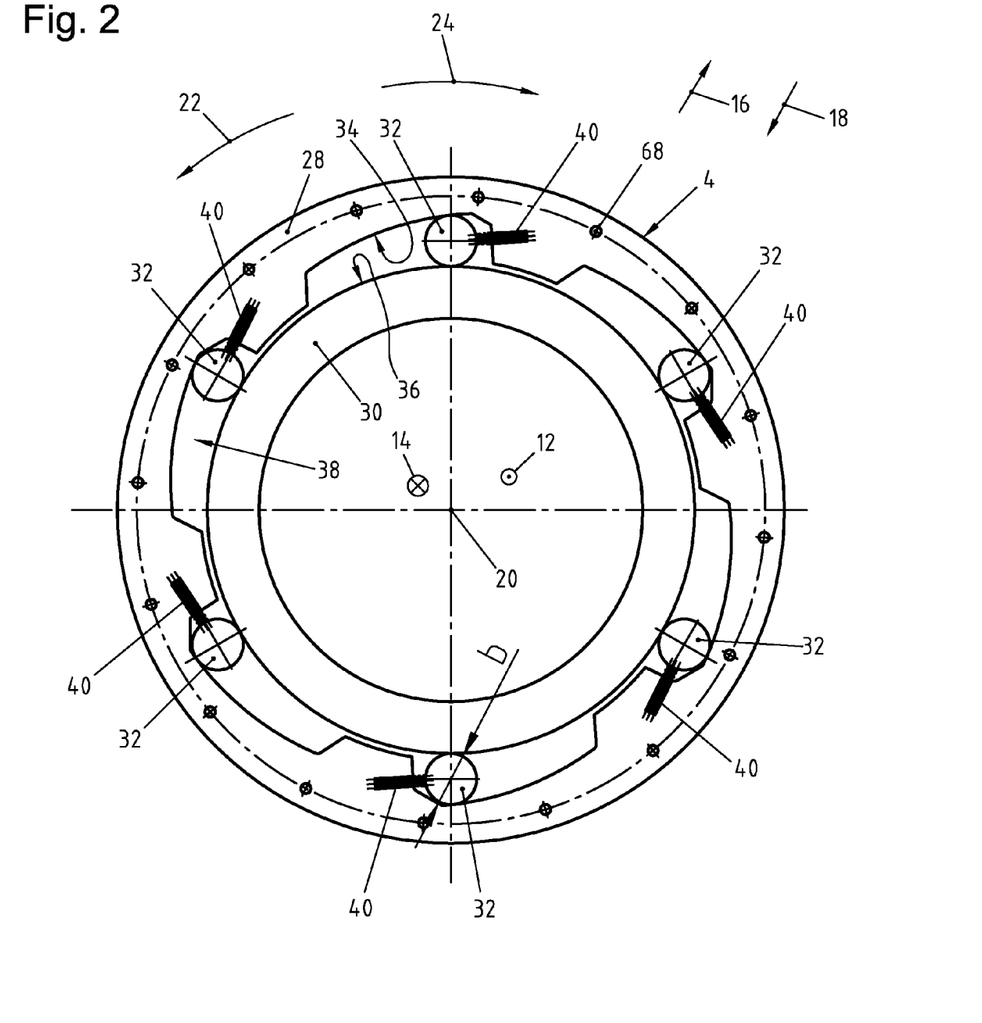
FIG. 2 shows a front view of the freewheel arrangement of FIG. 1 along the line of section A-A in FIG. 1.

FIGS. 1 and 2 show a first embodiment of the freewheel arrangement 2 according to the invention. The freewheel arrangement 2 basically comprises a freewheel 4, a starter 6, which is merely indicated schematically in FIG. 1, and a drive unit 8, of which the output side 10 in the form of an engine output hub is indicated by a dashed line in FIG. 1. In the figures, the mutually opposed axial directions 12, 14 and the mutually opposed radial directions 16, 18 of the freewheel arrangement 2 are indicated on the basis of corresponding arrows, wherein an axis of rotation 20 of the output side 10 and of the freewheel 4 extends in the axial directions 12, 14. In addition, the mutually opposed peripheral directions 22, 24 of the freewheel arrangement 2 are indicated on the basis of corresponding arrows, wherein the peripheral direction 22 will be referred to hereinafter as the first direction of rotation 22, whereas the peripheral direction 24 will be referred to as the second direction of rotation 24.

An output side 26 of the starter 6, which is indicated merely schematically in FIG. 1 and for example can be formed in the manner of a pinion, is arranged outside the freewheel 4 in the radial direction 16, such that reference can be made to a radially outwardly arranged output side 26 of the starter 6 based on the freewheel 4, whereas the output side 10 of the drive unit 8 in the form of the engine output hub is arranged in the radial direction 18 from the freewheel 4 such that reference can also be made to a radially inwardly arranged output side 10 of the drive unit 8 based on the freewheel 4.

The freewheel 4 comprises an outer ring 28 and an inner ring 30 nested radially with the outer ring 28. Clamping elements 32 are arranged in the radial direction 16, 18 between the outer ring 28 and the inner ring 30 and in the present example are formed as clamping rollers. The clamping elements 32 in the form of clamping rollers consequently have a circular periphery. In principle however, other clamping elements 32 can also be used here, that is to say for example clamping bodies or pawls. The outer ring 28 has a bearing surface 34, which faces towards the clamping elements 32 in the radial direction 18 and which has a shape deviating from a circle, as can be deduced from FIG. 2. By contrast, the inner ring 30 has a bearing surface 36, which points in the radial direction 16, faces towards the clamping elements 32 and is circular. A clamp gap 38 is consequently formed in the radial direction 16, 18 between the outer ring 28 and the inner ring 30 and tapers in the direction of rotation 22 in a region assigned to one of the clamping elements 32.

Based on the direction of rotation 22, 24, a connection with entrainment exists between the clamping elements 32 and the outer ring 28, wherein this connection with entrainment is caused on the one hand by the bearing surface 34 of the outer ring 28 deviating from a circle. On the other hand, this connection with entrainment can also be assisted by the spring elements 40 shown in FIG. 2, which is not absolutely necessary however, in particular since the main function of the spring elements 40 is to bias the clamping elements 32 in the form of the clamping rollers substantially in the direction of rotation 22 in the tapering clamp gap 38. For this purpose, the spring elements 40 are each supported on the side of the respective clamping element 32 pointing in the direction of rotation 24 and also on a side of the outer ring 28 or of the bearing surface 34 pointing in the direction of rotation 22. In order to assist the aforementioned connection with entrainment between the clamping elements 32 and the outer ring 28, the spring elements 40 could each be fastened both on the outer ring 28 and on the respective clamping element 32.

The previously described embodiment of the outer ring 28, the inner ring 30 and the clamping elements 32 has the effect that the outer ring 28 is rotatable in the first direction of rotation 22 relative to the inner ring 30 without sticking with the inner ring 30. If the outer ring 28 by contrast rotates in the second direction of rotation 24, the clamping elements 32 thus prevent a relative rotation of the outer ring 28 with respect to the inner ring 30 in the second direction of rotation 24, rather the clamping elements 32 in the direction of rotation 22 enter the tapering clamp gap 38, such that the outer ring 28 and inner ring 30 are stuck together and the rotation thereof is consequently coupled.

The outer ring 28, the inner ring 30 and the clamping elements 32 are each formed as a stamped sheet metal part. The manufacture of the freewheel 4 and thus of the freewheel arrangement 2 as a whole is hereby highly simplified. In addition, the clamping elements 32, formed here as clamping rollers, have a thickness a and an outer diameter b based on the axial directions 12, 14, wherein the ratio between the thickness a and the outer diameter b is 1:3 or less, preferably 1:4 or less, particularly preferably 1:5 or less, in order to achieve a short axial overall length of the freewheel 4 and also to create clamping elements 32 having a sufficiently high stability. Here, the thickness a of the clamping elements 32 is preferably at most 7 mm, which is accordingly also true for the torque transfer elements described in greater detail hereinafter, which are connected with rotary entrainment to the outer ring and inner ring 28 and 30 respectively. In addition, the freewheel 4 is formed as a dry-running freewheel 4, wherein the freewheel 4 for this purpose within the scope of the freewheel arrangement 2 is arranged within a dry chamber.

The freewheel 4 comprises a first torque transfer element 42 fastened in a rotationally engaged manner on the outer ring 28. The first torque transfer element 42 is fastened on the side of the outer ring 28 pointing in the axial direction 14 and extends inwardly in the radial direction 18 starting from the outer ring 28. Here, the first torque transfer element 42 is formed as a sheet metal part shaped in the manner of an annular disk, which again has been produced by stamping out, such that reference can also be made with regard to the first torque transfer element 42 to a stamped sheet metal part. As can be seen from FIGS. 1 and 2, the end of the first torque transfer element 42 pointing outwardly in the radial direction 16 is riveted to the outer ring 28 of the freewheel 4. The end of the first torque transfer element 42 pointing inwardly in the radial direction 18 is connected in a rotationally engaged manner to a freewheel hub 44 of the freewheel 4. For this purpose, the end of the first torque transfer element 42 pointing inwardly in the radial direction 18, said torque transfer element extending beyond the inner ring 30 of the freewheel 4 in the radial direction 18, is welded to the freewheel hub 44, as is indicated on the basis of the weld point 46 in FIG. 1. Alternatively, the first torque transfer element 42 could also be riveted to the freewheel hub 44 or even formed in one piece with the freewheel hub 44 however, such that the freewheel hub 44 would form a portion of the first torque transfer element 42 formed as a sheet metal part. In the present example, it is to be assumed that the freewheel hub 44 is a rotary part welded to the first torque transfer element 42.

Irrespectively of the type of connection of the freewheel hub 44 to the first torque transfer element 42, the freewheel hub 44 comprises a tubular portion 48, which, starting from the end of the first torque transfer element 42 pointing inwardly in the radial direction 18, extends in the axial direction 12 in order to then transition into a radial portion 50, which, starting from the tubular portion 48, extends inwardly in the radial direction 18. Continuous recesses 52 are provided in the radial portion 50 in the axial direction 12, 14 in order to be able to connect the freewheel hub 44 to the output side 10, here the engine output hub, of the drive unit 8 in a rotationally engaged manner by means of screws or other fastening means. In other words, the freewheel hub 44 is connected with rotary entrainment to the output side 10 of the drive unit 8. Consequently, the outer ring 28 of the freewheel 4 is connected with rotary entrainment to the output side 10 of the drive unit 8 via the first torque transfer element 42 and the freewheel hub 44. As can also be seen from FIG. 1, the output side 10 in the form of the engine output hub dips into the tubular portion 48 of the freewheel hub 44 in the axial direction 12 in order to be connected to the side of the radial portion 50 pointing in the axial direction 14, wherein the output side 10 in the form of the engine output hub is thus arranged so as to be radially nested with the clamping elements 32 and also the outer ring 28 and the inner ring 30 of the freewheel 4. This is also true for the radial bearing described in greater detail further below.

The freewheel 4 further comprises a second torque transfer element 54 fastened in a rotationally engaged manner on the inner ring 30. The second torque transfer element 54 is likewise formed as a sheet metal part, possibly as a stamped sheet metal part, shaped in the manner of an annular disk. In principle, the second torque transfer element 54 could be riveted via its end pointing inwardly in the radial direction 18 to the side of the inner ring 30 pointing in the axial direction 12, wherein this is not the case in the embodiment according to FIGS. 1 and 2. Rather, the end of the second torque transfer element 54 pointing inwardly in the radial direction 18 is connected in a rotationally engaged manner to a bearing outer race 56, wherein this is again achieved in the present case via a weld point 58. The inner ring 30 is connected in a rotationally engaged manner via its end pointing inwardly in the radial direction 18 to the bearing outer race 56 at a distance in the axial direction 14 from the end of the second torque transfer element 54 pointing inwardly in the radial direction 18, wherein this is again achieved by means of welding in the region of a weld point 60.

Starting from the bearing outer race 56, which is yet to be discussed in greater detail, the second torque transfer element 54 extends outwardly in the radial direction 16 beyond the outer ring 28 of the freewheel 4 in order to be connected with rotary entrainment to the output side 26 of the starter 6. For this purpose, the second torque transfer element 54 comprises a rotation-entraining contour at its end pointing outwardly in the radial direction 16, said rotation-entraining contour being provided in the present example in the form of a toothing 62, which consequently can also be referred to as an outer toothing. The rotation-entraining contour or toothing 62 can be provided here directly on the second torque transfer element 54 formed as a sheet metal part. It is also possible however, as can be seen in FIG. 1, to provide the rotation-entraining contour or toothing 62 in an entrainment ring 64, which is connected, preferably welded, in a rotationally engaged manner to the second torque transfer element 54 formed as a sheet metal part. So that the freewheel arrangement 2 is also suitable to a certain extent for a drive unit 8 having a stop-start function, the output side 26 of the starter 6 is permanently connected or engaged with rotary entrainment with the rotation-entraining contour or toothing 62. Thanks to the described embodiment, the inner ring 30 is connected with rotary entrainment via the bearing outer race 56, the second torque transfer element 54, the entrainment ring 64 and the toothing 62 to the output side 26, in this case of a pinion, of the starter 6.

Due to the spacing of the second torque transfer element 54 in the axial direction 12 from the inner ring 30, the outer ring 28 and the clamping elements 32, it is possible, as illustrated in FIG. 1, to arrange a partition wall 66 in the axial direction 12, 14 between the second torque transfer element 54 on the one hand and the outer ring 28, the inner ring 30 and the clamping elements 32 on the other hand. The partition wall 66, which is preferably formed as a sheet metal part, possibly a stamped sheet metal part, shaped in the manner of an annular disk, is connected here in a rotationally engaged manner to the side of the outer ring 28 pointing in the axial direction 12. Here, the connection is again preferably achieved via riveting, wherein the rivets already provided are particularly preferably used for this purpose and are already used to rivet the first torque transfer element 42 to the outer ring 28.

The inner ring 30 of the freewheel 4 is supported on the output side 10 of the drive unit 8 via a radial bearing 70, which in the present example is formed as a rolling bearing 72, more specifically as a ball bearing. Besides the bearing outer race 56 already mentioned beforehand, the rolling bearing 72 also comprises a bearing inner race 74 nested radially with the bearing outer race 56, between which corresponding rolling bodies 76 are arranged in the radial direction 16, 18 and, as already mentioned beforehand, are formed as balls in the present example. As can be seen from FIG. 1, the bearing inner race 74 is formed by a portion of the freewheel hub 44, more specifically by the tubular portion 48 of the freewheel hub 44. It can also be said that the bearing inner race 74 is formed in one piece with the freewheel hub 44. Alternatively, the bearing inner race 74 could also be formed by a portion of the first torque transfer element 42 and could thus be formed in one piece with the first torque transfer element 42. This would be the case for example if the illustrated torque transfer element 42 were formed in one piece with the freewheel hub 44 or if the first torque transfer element 42 were to comprise a corresponding tubular portion in order to be connected to the freewheel hub 44 only subsequent to such a tubular portion. In this case, the separate production and assembly of an additional, separate bearing inner race 74 is eliminated, in particular since the bearing inner race 74 is formed here in one piece with the first torque transfer element 42 or the freewheel hub 44.

The inner ring 30 is not supported directly however on the output side 10 of the drive unit 8 via the radial bearing 70 in the form of the rolling bearing 72, but rather the support is achieved indirectly via the rolling bearing 72 and the freewheel hub 44, alternatively via the first torque transfer element 42. Deviating herefrom, it is in principle also possible to support the inner ring 30 directly on the output side 10 of the drive unit 8 via the radial bearing 70. However, this would mean that the assembly of the freewheel 4 in the region of the starter 6 and the output side 10 of the drive unit 8 would be more complex, and therefore the embodiment shown in FIG. 1 is preferred. In addition, the radial bearing 70, here the rolling bearing 72, is nested radially with the clamping elements 32 and the outer ring 28 and inner ring 30 of the freewheel 4. With use of a rolling bearing 72, as illustrated in FIG. 1, the rolling elements 76 in particular are arranged so as to be radially nested with the clamping elements 32, the outer ring 28 and the inner ring 30. Due to the radial nesting of the radial bearing 70 with the clamping elements 32, the outer ring 28 and the inner ring 30, the stress of the freewheel 4, in particular of the torque transfer elements 42, 54 and of the clamping elements 32, is reduced. In addition, a key advantage of the bearing of both the outer ring 28 and of the inner ring 30 on the output side 10 of the drive unit 8 is to be considered the fact that the freewheel 4 is subject to just a low stress of the clamping elements 32 and of the outer ring 28 and of the inner ring 30, even in the event of deflections of the output side 10 of the drive unit 8 in the radial direction 16, in particular since the outer and inner ring 28, 30 substantially retain their spacing from one another in the radial direction 16, 18.

A second embodiment of the freewheel arrangement 2 according to the invention will be described hereinafter with reference to FIG. 3 and is substantially similar to the first embodiment according to FIGS. 1 and 2, such that merely the differences will be discussed hereinafter, with like reference signs being used for like or similar parts and the previous description applying accordingly for the rest.

Firstly, it is noted that the first torque transfer element 42 is fastened on the side of the outer ring 28 facing away from the drive unit 8. Accordingly, the partition wall 66 is fastened on the side of the outer ring 28 facing towards the drive unit 8. In addition, the freewheel hub 44 in the second embodiment according to FIG. 3 is formed in one piece with the first torque transfer element 42, such that the freewheel hub 44 forms a portion of the first torque transfer element 42 formed as a sheet metal part or stamped sheet metal part. The previously mentioned tubular portion 48 is also rather formed in a funnel-shaped manner in order to simplify the sheet metal forming process. This is also unproblematic based on the fact that the radial bearing 70 in the form of the rolling bearing 72 in the first embodiment is not necessary in the second embodiment according to FIG. 3, and therefore the portion 48 does not have to function as a bearing inner race. The second torque transfer element 54 by contrast is spaced in the axial direction 14 from the inner ring 30 and is thus arranged on the side of the freewheel 4 facing towards the drive unit 8.

Figure 3:
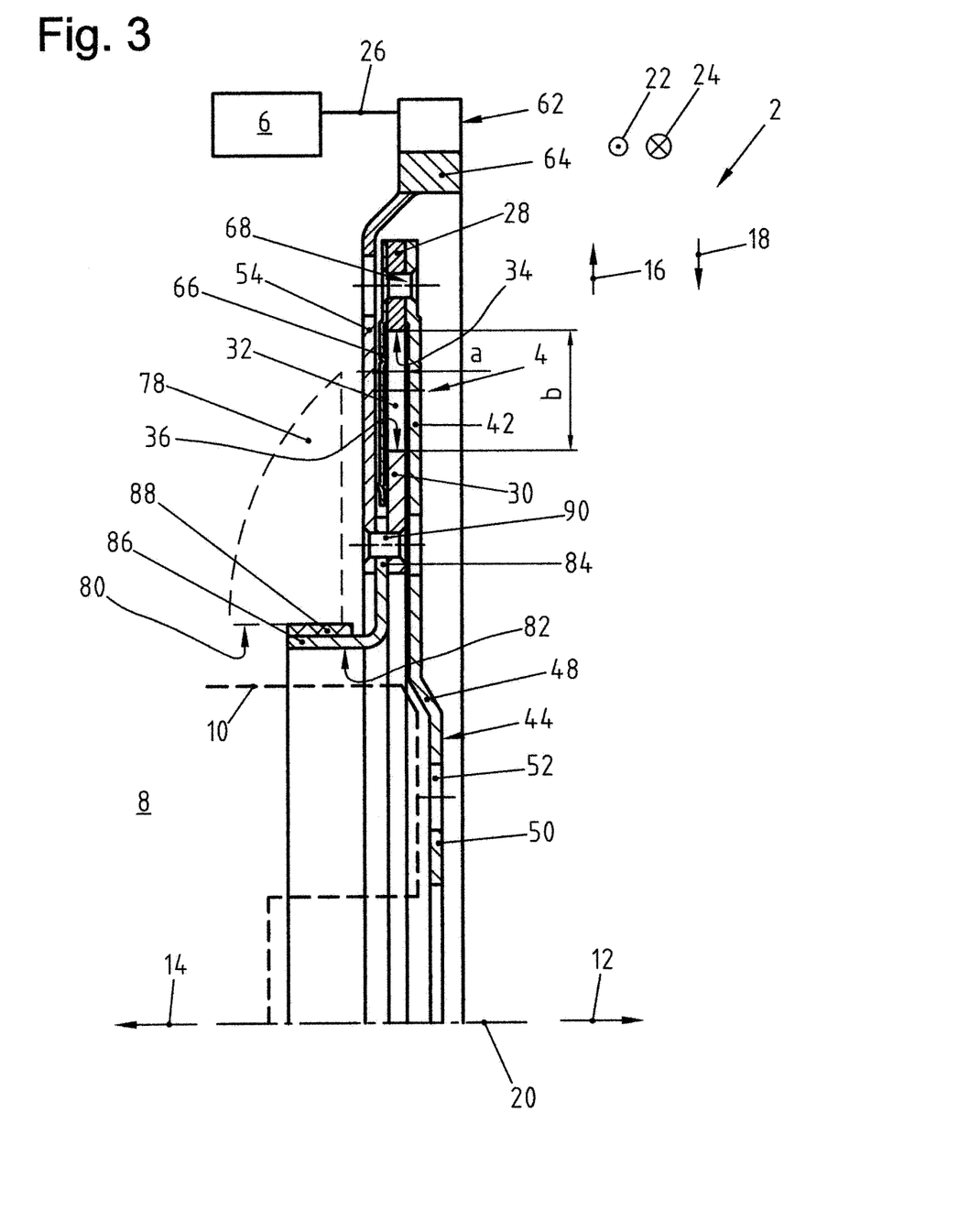
FIG. 3 shows a partial side view in section of a second embodiment of the freewheel arrangement according to the invention.

Since the rolling bearing 72 from the first embodiment is omitted in the second embodiment according to FIG. 3, the inner race 30 is supported on a fixed housing 78 in the second embodiment, said housing being an engine housing in this case, wherein it would also be possible to provide the support on a transmission housing. In the illustrated embodiment, the support is provided outwardly in the radial direction 16 on the inner side 80 of a housing opening in the housing 78, through which the output side 10 extends in the form of the engine output hub. In order to achieve this support, a support element 82 formed as a sheet metal part is provided. The support element 82 comprises a flange portion 84 shaped in the manner of an annular disk and extending in the radial direction 16, 18, and a tubular portion 86, which adjoins the flange portion 84 inwardly in the radial direction 18 and, starting from the flange portion 84, extends in the axial direction 14 into the housing opening in the housing 78 in order to be supported in the radial direction 16 on the inner side 80 of the housing opening, possibly via an intermediate element 88.

In the illustrated embodiment, the support element 82 is riveted together with the second torque transfer element 54 to the inner ring 30 via the rivets 90. In other words, the second torque transfer element 54 and the support element 82 use the same rivets 90 for fastening on the inner ring 30. As can be seen from FIG. 3, the second torque transfer element 54 is riveted here to the inner ring 30 with interpositioning of the flange portion 84 of the support element 82, that is to say the flange portion 84 of the support element 82 is arranged in the axial direction 12, 14 between the second torque transfer element 54 and the inner ring 30. The flange portion 84 of the support element 82 consequently causes the spacing of the inner ring 30 in the axial direction 12 with respect to the second torque transfer element 54, such that a sufficient installation space for the partition wall 66 already mentioned beforehand is also provided in the second embodiment according to FIG. 3.

Alternatively to the embodiment according to FIG. 3, the support element 82 could also be formed in one piece with the second torque transfer element 54, since the second torque transfer element 54 is lengthened inwardly in the radial direction 18 and in the axial direction 14 in the direction of the housing opening, thus forming the shape of the support element 82.

Both embodiments share the common feature that the freewheel 4 is provided in each case as a compact module, which can be installed as a connected unit in the region of the drive unit 8 and of the starter 6. In the first embodiment according to FIGS. 1 and 2, the outer ring 28, the inner ring 30, the clamping elements 32, the partition wall 66, the torque transfer elements 42, 54, the radial bearing 70 or rolling bearing 72, the freewheel hub 44 and the entrainment ring 64 with the toothing 62 thereof thus form a module that can be assembled as a connected unit. The key advantage of the module according to the first embodiment lies in the fact that, during assembly thereof, merely the connection to the output side 10 of the drive unit 8 and to the output side 26 of the starter 6 has to be observed.

In the second embodiment according to FIG. 3, the module that can be assembled as a connected unit is formed by the outer ring 28, the inner ring 30, the clamping elements 32, the partition wall 66, the torque transfer elements 42, 54, the freewheel hub 44, the entrainment ring 64 including the toothing 62, and the support element 82, possibly together with the intermediate element 88. In contrast to the module according to the first embodiment, during assembly of the module according to the second embodiment according to FIG. 3, the connection or support of the support element 82 on the fixed housing 78 also has to be observed during the assembly process, this being omitted with the module according to the first embodiment according to FIGS. 1 and 2, since the radial bearing 70 or rolling bearing 72 is already formed as a component of the connected unit and the support on the output side 10 of the drive unit 8 is thus already achieved by the fastening of the freewheel hub 44 on the output side 10 of the drive unit 8.

LIST OF REFERENCE SIGNS 2 freewheel arrangement
4 freewheel
6 starter
8 drive unit
10 output side
12 axial direction
14 axial direction
16 radial direction
18 radial direction
20 axis of rotation
22 peripheral direction/first direction of rotation
24 peripheral direction/second direction of rotation
26 output side
28 outer ring
30 inner ring
32 clamping elements
34 bearing surface of the outer ring
36 bearing surface of the inner ring
38 clamp gap
40 spring elements
42 first torque transfer element
44 freewheel hub
46 weld point
48 tubular or funnel-shaped portion
50 radial portion
52 recesses
54 second torque transfer element
56 bearing outer race
58 weld point
60 weld point
62 toothing
64 entrainment ring
66 partition wall
68 rivets
70 radial bearing
72 rolling bearing
74 bearing inner race
76 rolling element
67 fixed housing
80 inner side
82 support element
84 flange portion
86 tube portion
88 intermediate element 90 rivets
a thickness
b outer diameter

The invention claimed is:

1. A freewheel arrangement (2) having a freewheel (4), which comprises an inner ring (30), an outer ring (28) that is rotatable in a first direction of rotation (22) relative to the inner ring (30), the inner ring (30) and the outer ring (28) both being annular disks, and clamping elements (32) between the inner ring (30) and the outer ring (28), which prevent a rotation of the outer ring (28) relative to the inner ring (30) in a second direction of rotation (24), wherein the outer ring (28), the inner ring (30) and the clamping elements (32) are each formed as a stamped sheet metal part.

2. The freewheel arrangement (2) as claimed in claim 1, wherein the freewheel (4) comprises a first torque transfer element (42) fastened on the outer ring (28) in a rotationally engaged manner and a second torque transfer element (54) fastened on the inner ring (30) in a rotationally engaged manner, the first and second torque transfer elements (42, 54) being formed as an annular disk that is substantially flat, and the first and second torque transfer elements (42, 54) being riveted to the outer and inner rings (28; 30).

3. The freewheel arrangement (2) as claimed in claim 2 wherein the outer ring (28) is connected with rotary entrainment to an output side (10) of a drive unit (8), of an engine output hub, the output side (10) of the drive unit (8) being arranged radially inwardly based on the freewheel (4), whereas the inner ring (30) is connected in a rotationally engaging manner to an output side (26) of a starter (6), the output side (26) of the starter (6) being arranged radially outwardly based on the freewheel (4), the output side (26) of the starter (6) being engaged with rotary entrainment with the inner ring (30).

4. The freewheel arrangement (2) as claimed in claim 3, wherein the freewheel (4) comprises a freewheel hub (44), which is connected with rotary entrainment to the output side (10) of the drive unit (8), and is connected in a rotationally engaged manner to the first torque transfer element (42), the freewheel hub (44) being a rotary part.

5. The freewheel arrangement (2) as claimed in claim 1 comprising a drive unit (8) to which the outer ring (28) is connected, wherein the inner ring (30) is supported on an output side (10) of the drive unit (8), and a radial bearing (70), being arranged so as to be radially nested with the clamping elements (32).

6. The freewheel arrangement (2) as claimed in claim 1 wherein the clamping elements (32) are connected to the outer ring (28) with entrainment based on a peripheral direction (22, 24) of the freewheel (4), and the freewheel (4) is a dry-running freewheel (4), arranged in a dry chamber.

7. The freewheel arrangement (2) as claimed in claim 1 wherein the inner ring (30) and the outer ring (28) are substantially flat, wherein the clamping elements (32) are formed as clamping rollers, a bearing surface (36) of the inner ring (30) faces towards the clamping rollers and is circular, whereas a bearing surface (34) of the outer ring (28) faces towards the clamping rollers and has a shape deviating from a circle, and the clamping rollers are biased by means of a spring element (40) in the direction of a tapering clamp gap (38) between the inner and outer ring (30, 28), the spring element (40) being supported on the clamping rollers (32) and also on the outer ring (28).

8. The freewheel arrangement (2) as claimed in claim 1 comprising a first torque transfer element fixed to rotate with the outer ring and second torque transfer element fixed to rotate with the inner ring, wherein the clamping elements (32), have a thickness (a) and an outer diameter (b), the ratio between the thickness (a) and the outer diameter (b) being 1:5 or less, and the thickness (a) of the clamping elements (32), and also the thickness of the first and second torque transfer element (42; 54), being at most 7 mm.

9. The freewheel arrangement (2) as claimed in claim 1 comprising a first torque transfer element (42) fixed to the outer ring (28) and a second torque transfer element (54) fixed to the inner ring (30), the first and second torque transfer elements (42, 54) being formed as an annular disk that is substantially flat.

10. The freewheel arrangement (2) as claimed in claim 9 comprising a partition wall (66) disposed between the second torque transfer element (54) and each of the outer ring (28) and the inner ring (30).

11. The freewheel arrangement (2) as claimed in claim 9 comprising a rolling bearing (72) having an outer race (56) that is fixed to each of the inner ring (30) and the second torque transfer element (54).

12. The freewheel arrangement (2) as claimed in claim 11 wherein the freewheel arrangement rotates around an axis, wherein the second torque transfer element (54) includes an end that points inward toward the axis, the end attached to the outer race (56).

13. The freewheel arrangement (2) as claimed in claim 12 wherein the second torque transfer element (54) includes a second end opposite the end and comprising a starter (6) providing a starter output to the second torque transfer element (54) at the second end.

14. The freewheel arrangement (2) as claimed in claim 9 comprising a rolling bearing (72) having an inner race (74) that is fixed to the first torque transfer element (42).

15. The freewheel arrangement (2) as claimed in claim 14 wherein the freewheel arrangement rotates around an axis, wherein the first torque transfer element (42) includes an end that points inward toward the axis, the end attached to the inner race (74).

16. The freewheel arrangement (2) as claimed in claim 15 wherein the first torque transfer element (42), at the second end, is fastened to the outer ring (28).

17. The freewheel arrangement (2) as claimed in claim 16 comprising a hub (44) connected with the inner race (74) and a drive unit (8) providing output to the hub (44).

18. The freewheel arrangement (2) as claimed in claim 1 wherein the freewheel arrangement (2) rotates about an axis that extends in an axial direction, wherein the clamping elements (32) comprise rollers and have a diameter (b), and have a thickness (a) in the axial direction, the thickness (a) being less than one-third of the diameter (b), so that the freewheel arrangement (2) has a short overall length in the axial direction.

19. A freewheel arrangement (2) having a freewheel (4), which comprises an inner ring (30), an outer ring (28) rotatable in a first direction of rotation (22) relative to the inner ring (30), and clamping elements (32) between the inner ring (30) and the outer ring (28), which prevent a rotation of the outer ring (28) relative to the inner ring (30) in a second direction of rotation (24), wherein the outer ring (28), the inner ring (30) and the clamping elements (32) are each formed as a stamped sheet metal part, wherein the freewheel (4) comprises a first torque transfer element (42) fastened on the outer ring (28) in a rotationally engaged manner and a second torque transfer element (54) fastened on the inner ring (30) in a rotationally engaged manner, the first and second torque transfer elements (42, 54) being formed as an annular disk, and the first torque transfer element (42) being riveted to the outer ring (28), the freewheel arrangement (2) comprising a drive unit (8) to which the outer ring (28) is connected, wherein the inner ring (30) is supported on an output side (10) of the drive unit (8), and a radial bearing (70), being arranged so as to be radially nested with the clamping elements (32), wherein a rolling bearing (72) comprises a bearing inner race (74) supported on a freewheel hub (44), and a bearing outer race (56) with intermediately arranged rolling elements (76), the bearing inner race (74) being formed by a portion (48) of the first torque transfer element (42) or of the freewheel hub (44), the second torque transfer element (54) being fastened indirectly in a rotationally engaged manner on the inner ring (30) via the bearing outer race (56).

20. A freewheel arrangement (2) having a freewheel (4), which comprises an inner ring (30), an outer ring (28) rotatable in a first direction of rotation (22) relative to the inner ring (30), and clamping elements (32) between the inner ring (30) and the outer ring (28), which prevent a rotation of the outer ring (28) relative to the inner ring (30) in a second direction of rotation (24), wherein the outer ring (28), the inner ring (30) and the clamping elements (32) are each formed as a stamped sheet metal part, wherein the freewheel (4) comprises a first torque transfer element (42) fastened on the outer ring (28) in a rotationally engaged manner and a second torque transfer element (54) fastened on the inner ring (30) in a rotationally engaged manner, the first and second torque transfer elements (42, 54) being formed as an annular disk, and the first and second torque transfer elements (42, 54) being riveted to the outer and inner rings (28; 30), wherein the inner ring (30) is supported in the radial direction (16, 18), on a fixed housing (78), of an engine or transmission, the support being provided via a support element (82), which is connected with the second torque transfer element (54) and the inner ring (30), the support element (82) comprising a flange portion (84) and a tube portion (86), and the second torque transfer element (54) being connected to the inner ring (30) with interpositioning of the flange portion (84).

\* \* \* \* \*